United States Patent [19]

McCullough, Jr. et al.

[11] Patent Number: 5,258,464

[45] Date of Patent: Nov. 2, 1993

[54] IMPACT COPOLYMER COMPOSITIONS

[75] Inventors: James D. McCullough, Jr., Houston, Tex.; Harold K. Ficker, Wayne, N.J.

[73] Assignee: Shell Oil Company, Houston, Tex.

[21] Appl. No.: 821,676

[22] Filed: Jan. 16, 1992

Related U.S. Application Data

[63] Continuation-in-part of Ser. No. 471,467, Jan. 29, 1990, abandoned.

[51] Int. Cl.$^5$ .................. C08L 23/10; C08L 23/26
[52] U.S. Cl. .................. 525/244; 525/240; 525/242; 525/245; 525/268; 525/322; 525/324; 525/331.7; 525/333.7; 525/387
[58] Field of Search ............... 525/244, 245, 247, 268, 525/322, 323, 324, 331.7, 240

[56] References Cited

U.S. PATENT DOCUMENTS

| | | | |
|---|---|---|---|
| 3,514,501 | 7/1963 | Leibson et al. | 525/53 |
| 4,337,326 | 6/1982 | Shiga et al. | 525/244 |
| 4,375,531 | 3/1983 | Ross | 525/93 |
| 4,379,759 | 4/1983 | Goeke et al. | 502/104 |
| 4,473,687 | 9/1984 | Dorrer et al. | 525/240 |
| 4,483,966 | 11/1984 | Suzuki et al. | 525/323 |
| 4,508,872 | 4/1985 | McCullough, Jr. | 525/88 |
| 4,521,566 | 6/1985 | Galli et al. | 525/247 |
| 4,526,931 | 7/1985 | Chiba et al. | 525/247 |
| 4,550,145 | 10/1985 | Kasahara et al. | 525/323 |
| 4,582,878 | 4/1986 | Chiba et al. | 525/323 |
| 4,728,705 | 3/1988 | Nestlerode et al. | 526/125 |
| 4,812,526 | 3/1989 | Rifi | 525/240 |
| 4,822,840 | 4/1989 | Kioka et al. | 525/240 |
| 4,948,841 | 8/1990 | Kasahara et al. | 525/240 |
| 4,966,944 | 10/1990 | Kiang | 525/88 |
| 5,081,189 | 1/1992 | Yamada et al. | 525/323 |

FOREIGN PATENT DOCUMENTS

| | | |
|---|---|---|
| 208330 | 7/1986 | European Pat. Off. . |
| 225099 | 6/1987 | European Pat. Off. . |
| 57098-519 | 12/1980 | Japan . |
| 58-210949A | 6/1982 | Japan . |
| 60217-207A | 4/1984 | Japan . |

OTHER PUBLICATIONS

F. P. Baldwin et al. "Rubber Chemistry and Technology", vol. 45, pp. 741-744, 751-744 (1972).
F. W. Billmeyer, Jr., "Textbook of Poly. Science", Interscience Publishers, N.Y., N.Y., p. 9.

Primary Examiner—James J. Seidleck
Assistant Examiner—M. L. Warzel
Attorney, Agent, or Firm—Otto O. Meyers, III

[57] ABSTRACT

Polypropylene impact copolymer compositions demonstrate not only good low temperature properties, including impact strength, but also resistance to stress whitening when the numerical ratio of the intrinsic viscosity of the copolymer phase to the intrinsic viscosity of the homopolymer phase is near unity and ethylene contents of the copolymer phase are in the range of 38% to 60% by weight. The impact copolymer compositions are useful in the production of molded and extruded articles, shaped containers, and films having good clarity.

9 Claims, No Drawings

IMPACT COPOLYMER COMPOSITIONS

This is a continuation-in-part of application Ser. No. 07/471,467 filed Jan. 29, 1990, now abandoned.

FIELD OF THE INVENTION

This invention relates to the production of certain polypropylene compositions of good impact strength and stiffness and also of improved resistance to stress whitening. More particularly, the invention relates to certain polypropylene impact copolymers having a ratio of intrinsic viscosities of the copolymer phase to homopolymer phase within specified limits. The invention particularly relates to such compositions as produced by gas phase polymerization.

BACKGROUND OF THE INVENTION

Polypropylene polymeric compositions have gained wide commercial acceptance and usage in numerous commercial applications because of the relatively low cost of the polymers and the desirable properties they exhibit. In general, polypropylene polymers, particularly propylene homopolymers, have a disadvantage of being brittle with low impact resistance, especially at low temperatures. Numerous procedures have been proposed for modifying the properties of the propylene homopolymers to improve the impact strength and other low temperature properties. Many if not most of such proposals have included the provision of a propylene/α-olefin copolymer portion in otherwise homopolymeric polypropylene. The structure of such modified polypropylene polymers is variable, but somewhat uncertain. In Leibson et al, U.S. Pat. No. 3,514,501, there is described a process for the production of block copolymers wherein, for example, a prepolymer which is homopolymeric polypropylene is produced and a block of at least one α-olefin is grown from the prepolymer in a second polymerization step. A second approach to providing improved impact strength comprises the mixing of a polypropylene homopolymer with a propylene/ethylene copolymer. Most proposals, and most commercial products of high impact strength, result from the production of a first polymer, usually a polypropylene homopolymer, and the production of a copolymeric portion in the presence of the initial polymer product mixture which still contains active polymerization sites. Whether the resulting product is a block copolymer, a mixture of homopolymer and copolymer or is of other structure is not entirely clear. However, such products are well known and conventional in the art and have achieved considerable commercial importance. They are often referred to as polypropylene impact copolymers, regardless of the precise nature of their structure, and are said to contain a homopolymer phase (often homopolymeric polypropylene) and a rubber phase (the copolymer portion).

While such a polypropylene impact copolymer does exhibit improved low temperature impact strength and other improved low temperature properties as well as many of the desirable properties of the homopolymer such as stiffness, the impact copolymer compositions may exhibit considerable stress whitening under circumstances such as a) ejecting parts from molds (knock-out pin marks); b) the forming of shaped articles from sheet stock, etc., at temperatures in the vicinity of melting and below; and c) the general situation of impacting or bending of fabricated parts either during their production or assembly, or in their intended application.

A number of procedures have been described which are designed to produce compositions having good low temperature properties and better resistance to stress whitening. Many of these procedures include an extra processing step or the inclusion within the composition of an extra component. In European Patent Application 208,330 there are disclosed polymeric polypropylene compositions said to have improved resistance to stress whitening which comprise homopolymeric polypropylene or peroxide-degraded polypropylene which have a grafted ethylene/propylene copolymer portion, and as an additional component, an ester derived from a monocarboxylic acid of 12-20 carbon atoms and a polyhydric alcohol. In Japanese Patent J58210949A there is described a mixture of polypropylene of specified melt flow and an ethylene/unolefin copolymer wherein the molecular weight of the polypropylene has been reduced substantially by treatment with peroxide. The compositions are said to have resistance to stress whitening as well as improved gloss and transparency, although in many other instances the reduction of molecular weight by peroxide treatment, a process known as visbreaking, served to increase rather than decrease stress whitening. It would be of advantage to provide improved polypropylene compositions characterized by good low temperature properties such as impact strength and also good resistance to stress whitening.

SUMMARY OF THE INVENTION

The present invention provides improved polypropylene impact copolymer compositions. More particularly, the present invention relates to a gas-phase production of polypropylene impact copolymers wherein the numerical ratio of the intrinsic viscosity of the copolymer portion to the intrinsic viscosity of the homopolymer portion is within certain limits. The resulting impact polymer compositions have improved resistance to stress whitening as well as the good impact strength and stiffness normally associated with polypropylene impact copolymers.

DESCRIPTION OF THE INVENTION

The present invention relates to certain polypropylene compositions having an improved balance of properties. The compositions of the invention are produced by gas phase polymerization procedures which are broadly conventional and the compositions are characterized by a numerical ratio of the intrinsic viscosity of the copolymer portion to the intrinsic viscosity of the homopolymer portion which is near unity. The precise intrinsic viscosity of either individual portion is not material so long as the ratio of intrinsic viscosities is within the desired range.

The term intrinsic viscosity as used herein is used in its conventional sense to indicate the viscosity of a solution of a material, in this case a solution of a polymer, in a given solvent at a given temperature, when the polymer is at infinite dilution. According to the ASTM standard test method D 1601-78, its measurement involves a standard capillary viscosity measuring device, in which the viscosity of a series of concentrations of the polymer in the solvent at the given temperature are determined. In the case of the polymers of the present invention, decalin (decahydronaphthalene) is an illustrative suitable solvent and a typical temperature is 135° C. From the values of the viscosity of solutions of varying concentration, the "value" at infinite dilution can be determined by extrapolation. In the case of the present polypropylene impact copolymers, the homopolymer portion is initially produced and the intrinsic viscosity of that portion is measured directly. The intrinsic viscosity of the copolymer portion cannot be measured directly. The intrinsic viscosity of the total rubber modified impact copolymer is determined and the intrinsic viscosity of the copolymer ($[\eta]$ whole) portion is calculated as the quotient of the intrinsic viscosity of the total ($[\eta]_{whole}$) copolymer less the fraction of homopolymer times its intrinsic viscosity ($[\eta]_{homo}$), all divided by the fraction of the total copolymer which is copolymer. The formula is $$[\eta]_{copol} = \frac{[\eta]_{whole} - (1 - F_c)[\eta]_{homo}}{F_c}$$

where $F_c$ is the fraction of copolymer (expressed as a fraction here). This fraction is also determined by conventional procedures involving infrared analysis or reactor heat balance.

The polymerization process of the invention is conducted in a gas phase in the presence of a stereoregular olefin polymerization catalyst. Such catalysts are broadly well known and conventional and are employed in the polymerization of α-olefins of three or more carbon atoms to produce stereoregular products. In terms conventionally employed to describe such catalysts, the stereoregular catalysts of high catalytic activity contain as a first constituent a procatalyst which is a titanium-containing solid, usually a titanium halide-containing solid, and which often contains an electron donor such as an aromatic ester. Suitable electron donors which may be used in the preparation of the solid catalyst component are ethers, esters, ketones, phenols, amines, amides, imines, nitriles, phosphines, phosphites, stilbenes, arsines, phosphoramides and alcoholates. The electron donors may be used singly or in combination. Preferred electron donors for use in preparing the titanium constituent are ethyl benzoate and isobutyl phthalate. The second catalyst constituent, termed a co-catalyst, is an organoaluminum compound which may be partly or totally complexed with the third catalyst constituent, conventionally termed a selectivity control agent.

Aromatic esters, amines, hindered amines, esters, phosphites, phosphates, aromatic diesters, alkoxy silanes, aryloxy silanes, silanes, hindered phenols and mixtures thereof may be useful as the selectivity control agent in the inventive process.

Such stereoregular olefin polymerization catalysts are described in numerous patents and other references including Nestlerode et al, U.S. Pat. No. 4,728,705. Although a variety of chemical compounds are useful as the constituents of the polymerization catalysts, a typical stereoregular olefin polymerization catalyst contains as procatalyst a solid comprising a magnesium halide, a titanium halide and an electron donor such as ethyl benzoate. The halide moieties of such procatalysts are customarily chloride moieties. The co-catalyst is typically triethylaluminum or tri-isobutylaluminum which is often at least partially complexed with an aromatic ester such as ethyl p-ethoxybenzoate, ethyl p-methoxybenzoate or methyl p-methylbenzoate as the selectivity control agent, or a silane such as diisobutyl dimethoxy silane. Use of the catalysts of this type results in a stereoregular polymeric product when olefins of three or more carbon atoms are polymerized and many of the catalysts are recognized as high activity catalysts being able to cause the formation of polymers of desirable properties without the necessity of removing catalyst residues in a de-ashing step.

These catalysts are used in established processes to polymerize or copolymerize α-olefins. The processes may employ a liquid, non-polymerizable diluent or alternatively may employ as liquid diluent a monomer of the polymerization. To produce the impact copolymers of the invention, however, it is desirable to utilize a gas phase process. To obtain impact copolymers of an intrinsic viscosity ratio within the desired limits when polymers of high melt flow are produced, polymer of low molecular weight must be present in the reactor system. This low molecular weight material, particularly when ethylene/propylene copolymer is produced, serves as a sticky binding agent and in liquid-phase systems will generally cause substantial reactor fouling and possible loss of otherwise active material with removed solvent or diluent. In liquid copolymer reactor systems this lower molecular weight material must be avoided and the ratio of intrinsic viscosities of the hompolymer and copolymer portions cannot be within the presently desired numerical limits. See, for example, published European Patent Application 225,099.

A number of gas phase polymerization processes are available but one such process which is illustratively and suitably used to produce the impact copolymer products of the invention is described by Goeke et al, U.S. Pat. No. 4,379,759, which involves a fluidized bed, gas phase system. The Goeke et al references is incorporated by reference.

A gas phase process is typically operated by charging to a suitable reactor an amount of preformed polymer particles and lesser amounts of catalyst components. The olefin or olefins to be polymerized as a gas is passed through the bed of particles at a high rate and under polymerization conditions of temperature and pressure sufficient to initiate polymerization. Upon passing through the particle bed the unreacted gas is withdrawn from the reactor and recycled together with make-up feed gas. As the catalyst is lost through incorporation of minute amounts of catalyst within the polymer product, additional catalyst is provided to the reactor, often through the use of an inert transport gas such as nitrogen or argon. The reaction temperature is selected to be below the sintering temperature of the polymer particles and is controlled by an external heat exchanger in the gas cycle. Reaction temperatures from about 30° C. to about 120° C. may be used with reaction temperatures from about 50° C. to about 90° C. being more commonly used. The reaction pressure is generally up to about 1000 psi with pressures from about 100 psi to about 400 psi being preferred. The precise control of reaction conditions as well as the addition of catalyst and feed gas and the recycle rate of unreacted monomer is within the skill of the art. An additional means of reaction and product control is achieved by the provision for the addition of molecular hydrogen to the reactor and thus the polymerization system. The addition of molecular hydrogen serves to control the molecular weight of the product, most likely by functioning as a chain transfer agent. Control of molecular weight of the polymeric product also in part determines the intrinsic viscosity of the product which is, of course, of particular importance in the case of the impact copolymers of the invention. The use of hydrogen to control polymer molecular weight and thus product intrinsic viscosity is also within the skill of the art.

The desired polymer products are obtained as particulate matter formed by growth of polymer product on the polymer particles provided to the fluidized bed or as particles formed in the reactor. The product particles are removed from the reactor at a rate which is substantially equivalent to the rate of polymer production and are passed to a subsequent reaction zone or are finished by conventional methods prior to use.

It is conceivable, although impractical, to produce the impact copolymers of the invention in a single reactor by control of the composition of feed gas and recycle of unreacted monomer and polymeric product. However, it is more common to operate the gas phase process for the production of the compositions of the invention in a two-stage process wherein each stage operates in the gas phase in a separate reactor. In such a modification, the homopolymer portion of the impact copolymer is initially produced as described above in a suitable gas phase reactor which generally but not necessarily employs hydrogen to control the molecular weight of the product and thus the intrinsic viscosity of this product. This initial homopolymer product containing active catalyst sites is then passed to a second gas phase reactor containing a second fluidized bed. A portion of unreacted monomer from the initial polymerization step is also passed to the second reactor together with the monomers to be employed in the production of the copolymer phase. The production of copolymer or rubber phase takes place in the second reactor where it may also be desirable to provide molecular hydrogen to control molecular weight and thus intrinsic viscosity. Two or more gas phase homopolymer or copolymer reactors could be used in various sequential or parallel arrangements, involving production of homopolymer and copolymer, as long as the intrinsic viscosity ratio requirements are met.

The homopolymer phase of the compositions of the invention is predominantly but not necessarily propylene homopolymer. To obtain particular properties for special applications it may be desirable to incorporate in the otherwise homopolymer portion of the impact copolymer compositions a small amount, i.e., up to about 6% by weight, of a second α-olefin such as ethylene, 1-butene or even a higher molecular weight α-olefin. The incorporation of the optional small amounts of other α-olefin is by conventional methods and serves to modify but not substantially alter the properties of the homopolymer phase. In the embodiments where a small amount of other α-olefin is provided the product, although technically a copolymer, is still referred to as the homopolymer phase. Such homopolymer phases which are substantially polypropylene, i.e., phases produced in the substantial absence of second α-olefin, are preferred.

The second phase or copolymer phase typically comprises predominantly a copolymer of ethylene and propylene although small amounts of other α-olefin moieties could optionally be present. Through control of the proportion of unreacted propylene from the initial reactor and the proportion of ethylene provided to the copolymerization reactor it is possible, and conventional, to vary the proportion of ethylene in the ethylene/propylene copolymer fraction. Within the impact copolymers of the invention the proportion of ethylene in the copolymer phase is suitably from about 38% by weight to about 60% by weight based on total copolymer phase. Proportions of ethylene in the copolymer phase from about 40% by weight to about 60% by weight on the same basis are preferred and portions from about 40% by weight to about 55% by weight being more preferred. (Crystallinity being determined by Differential Scanning Calorimeter). Although the copolymer phase is somewhat crystalline, the crystallinity is not greater than about 8% by weight based on weight of the copolymer phase Crystallinity of the copolymer phase from about 1% to about 6% is preferred with crystallinity from about 2% to about 5% being more preferred. It is also known to control the relative proportions of homopolymer phase and copolymer phase in the impact copolymer product. The copolymer or rubber phase suitably constitutes from about 10% by weight to about 50% by weight of the total polymeric impact copolymer composition. Proportions of copolymer phase from about 10% by weight to about 40% by weight on the same basis are preferred and 12% by weight to about 30% by weight being more preferred.

The products of the invention are therefore polypropylene impact copolymers produced by gas phase process, usually involving hydrogen to control molecular weight, wherein the numerical ratio of the intrinsic viscosity of the copolymer phase to the homopolymer phase is near unity. Numerical ratios of the intrinsic viscosities from about 1.1 to about 1.3 are satisfactory for non-visbroken products, with numerical ratios from about 1.1 to about 1.2 being preferred. The intrinsic viscosity of either phase or of the impact copolymer product is not material, so long as the ratio is satisfactory, although intrinsic viscosities of the products or phases, when measured in decalin at 135° C., from about 0.7 dl/g to about 7 dl/g are typical.

Described in different terms, the impact copolymers produced by typical gas phase processes as described above will have melt flows, expressed in dg/min, as determined by a conventional test procedure such as ASTM-1238 Cond. L of from about 10 to about 70, with values from about 20 to about 70 being preferred and from about 30 to about 60 being more preferred. For some particular product applications, it is desirable to have impact copolymer of higher melt flow or lower molecular weight. Increase of the melt flow of a polyolefin polymeric product is frequently done by the mentioned use of hydrogen; however, it is also within the skill of the art by procedures which involve treatment with peroxide or "visbreaking". The desired improvement of low temperature properties and resistance to stress whitening are obtained in impact copolymers of higher melt flow produced by visbreaking when the intrinsic viscosity ratio of the phases of the impact copolymer to be treated with peroxide is within the desired numerical limits. With visbreaking, stress whitening increases with peroxide usage level. For this reason, the upper limit of viscosity ratio for visbroken products is about 1.3 for good stress whitening performance, and a value of 1.2 is preferred. Typical melt flows for visbroken polymers are from about 2 to about 200.

The compositions of the invention as well as the peroxide-treated derivatives thereof are characterized by the good impact resistance and other good low temperature properties of conventional polypropylene impact copolymers. However, in contrast with conventional polypropylene impact copolymers, the compositions exhibit improved resistance to stress whitening which is of importance when the polymer is employed to produce final products where outward appearance is important. The polymeric compositions may incorporate a variety of the additives such as stabilizers, antioxidants, fillers, colorants, nucleating agents and mold release agents which are conventionally employed in commercial polypropylene compositions. The compositions are processed by conventional procedures used for thermoplastic materials such as injection molding, extrusion, thermoforming and related processes. Better gloss is often seen on fabricated articles. Among particular applications for the compositions are the production of molded and extruded automotive parts, small appliance housings, film of improved clarity and gloss as well as improved low temperature toughness for applications such as stackable trays and luggage.

The invention is further illustrated by the following Illustrative Embodiments which should not be regarded as limiting.

ILLUSTRATIVE EMBODIMENT I

A number of samples of polypropylene impact copolymer, both within and without the scope of the invention, were produced and injection molded disks, 2.5 in. in diameter by 0.125 in. thick, were prepared from each sample. The stress whitening of each sample was measured in a standard Gardner impact apparatus with the ring removed, by dropping an impactor which contacts each disk from a determined height and measuring the diameter of the white spot on the opposite side on each disk caused by the impact of the weight (all tests run after 24 hours after molding). The impact properties ar determined in a conventional Gardner $-30°$ C. impact test (ASTM D 3029, Procedure G). A two pound weight was used from heights of 5 and 10 inches to obtain impacts of 10 in-lb and 20 in-lb respectively. In this and other examples, the intrinsic viscosity ratio ("Ratio") was conveniently calculated from the relationship to melt flow as follows:

$$\text{Ratio} = 1 + \frac{(MF_{homo}/MF_{whole})^{0.213} - 1}{F_c}$$

where $MF_{homo}$ is the melt flow of the homopolymer phase, $MF_{whole}$ is the melt flow of the impact copolymer composition and $F_c$ is the weight percentage ethylene/propylene copolymer rubber, expressed as the fraction.

It is evident that stress whitening improves as the value for the ratio decreases toward unity.

ILLUSTRATIVE EMBODIMENT II

A series of polypropylene impact copolymer samples were produced in a large scale unit. Certain of the samples, Samples 2, 4 and 5, were visbroken after production. Injection molded test specimens were produced from each sample and the properties of the samples were determined by standard test procedures except for stress whitening which was determined by the procedure of Illustrative Embodiment I. The results are shown in Table I. It is seen that the stress whitening is improved for Sample 1 versus 3 at 20 in-lb, even allowing for the much higher $F_c$ for Sample 1 (stress whitening trends upward with increasing $F_c$). Further, for visbroken Samples 2, 4 and 5, stress whitening is markedly improved for Sample 2.

TABLE I

| Sample | 1 | 2 | 3 | 4 | 5 |
|---|---|---|---|---|---|
| Visbroken | no | yes | no | yes | yes |
| % wt copolymer ($F_c$) | 20.3 | 20.5 | 15.3 | 22.1 | 18.1 |
| % wt ethylene in copolymer ($E_c$) | 46.5 | 47.3 | 49.3 | 59.6 | 60.7 |
| Ratio (before visbreaking) | 1.2 | 1.2 | 1.5 | 1.5 | 1.5 |
| Melt Flow dg/min | 8.0 | 16.8 | 7.8 | 14.2 | 7.5 |
| Notched Izod, ft.lb/in, $-20°$ C. | 1.00 | 0.75 | 0.63 | 1.18 | 0.97 |
| Gardner Impact, in-lb, $-30°$ C. | 230 | 215 | 163 | 250 | 202 |
| Flex. Mod., Tan. × $10^{-3}$, psi, 0.05 in/min | 125 | 110 | 162 | 109 | 122 |
| Weld Line Strength, % elong. to break | 4.0 | 4.1 | 3.3 | 4.1 | 3.1 |
| Stress Whitening, Diam. inches | | | | | |
| 10 in-lb | 0.64 | 0.67 | 0.62 | 0.81 | 0.77 |
| 20 in-lb | 0.73 | 0.80 | 0.83 | 0.94 | 0.87 |

ILLUSTRATIVE EMBODIMENT III

The series of samples in Illustrative Embodiment I were examined for stress whitening in a test which involved bending tensile test speciments (6.5 in. length×0.5 in. ×0.125 in. ASTM tensile bars). In the test a tensile bar would be flexed 180 degrees about its mid-section so that the ends touched; it would then be straightened, and flexed 180 degrees in the other direction. This would be done ten times, with the bending rate being in the normal range for convenient flexing (a few seconds per test). Stress whitening measurements are made at least 24 hours after testing.

| Sample | 1 | 2 | 3 | 4 | 5 |
|---|---|---|---|---|---|
| Length of Whitened Area (measured at midpoint), in: | 0.8 | ~0.4 | 1.1 | 0.8 | 0.8 |
| Whitening Intensity[1]: | L | VL | H | H | M |

[1] H = High, M = Moderate, L = Low, VL = Very Low

In this test, it is seen that the low intrinsic viscosity ratio samples, 1 and 2, are markedly better than the other samples in terms of reduced stress whitening.

ILLUSTRATIVE EMBODIMENT IV

Run 12FDHX-76 at South Charleston pilot plant:

| Sample No. | 63 | 64 | 65 | 66 | |
|---|---|---|---|---|---|
| $F_c$ | 20 | 14.7 | 16.9 | 18.6 | |
| $E_c$ | 56 | 57 | 62 | 63 | |
| MF | 1.9 | 2.0 | 10.4 | 10.6 | |
| Ratio | 1.15 | 1.5 | 1.14 | 1.5 | |
| Gardner[1] $-30°$ C. | 215 | 165 | 170 | 208 | ←in-lb |
| Stress Whitening[2] | | | | | |
| 10 in-lb | 0.53 | 0.56 | 0.56 | 0.64 | ←in |
| 20 in-lb | 0.65 | 0.66 | 0.68 | 0.74 | ←in |

[1] Ring in; 2 in × 0.125 in disk
[2] Ring out; 4 in × 0.125 in disk

Data were developed in accordance with Illustrative Embodiments I and II.

Comparisons are made of the 2 melt flow (nominal) samples 63 and 64, and of the 10 melt flow (nominal) materials 65 and 66 (non-visbroken). It is seen that in each pair the low ratio sample exhibits the least amount of stress whitening. Allowance should be made for the significant $F_c$ difference for the comparison of 63 and 64, since sample 63 would be expected to have higher stress whitening than sample 64 on the basis of its substantially higher $F_c$.

What is claimed is:

1. A polypropylene impact copolymer composition consisting essentially of a homopolymer phase of propylene homopolymer and a copolymer phase of copolymer of ethylene and propylene, wherein the ratio of the intrinsic viscosity of the copolymer phase to the homopolymer phase is form bout 1.1 to about 1.3, the copolymer phase has from about 38% by weight to about 60% by weight of ethylene, based on total copolymer phase, the copolymer phase has a crystallinity of at most about 8% by weight based on the weight of the copolymer phase and the impact copolymer has a melt flow of from about 10 dg/min to about 70 dg/min, as determined by ASTM-1238 Cond. L.

2. The composition of claim 1 wherein the copolymer phase is from about 10% by weight to about 50% by weight of the total polymeric composition.

3. The composition of claim 2 wherein the intrinsic viscosity ratio is from about 1.1 to about 1.2.

4. The composition of claim 3 wherein the copolymer phase has a crystallinity of 1% to about 6% by weight based on the weight of the copolymer.

5. The composition of claim 1 wherein the copolymer phase is from about 12% by weight to about 40% by weight of the total polymeric composition.

6. The composition of claim 5 wherein the intrinsic viscosity ratio is from about 1.1 to about 1.2.

7. The composition of claim 6 wherein the copolymer phase has a crystallinity of 1% to about 6% by weight based on the weight of the copolymer.

8. The composition of claim 1 wherein said polypropylene impact copolymer composition has been visbroken resulting in a composition having a melt flow of from about 2 to about 200 dg/min according to ASTM-1238, condition L, and initially having prior to visbreaking an intrinsic viscosity ratio of about 1.1 to about 1.3.

9. The composition of claim 8 wherein the intrinsic viscosity ratio is from 1.1 to 1.2.

* * * * *